(12) United States Patent
Ohkubo

(10) Patent No.: US 6,916,268 B2
(45) Date of Patent: Jul. 12, 2005

(54) AUTOMATIC SPEED CHANGE APPARATUS

(76) Inventor: Masahiro Ohkubo, 17-8, Sakuragaoka 2-chome, Seikacho, Sorakugun, Kyoto 619-0232 (JP)

( * ) Notice: Subject to any disclaimer, the term of this patent is extended or adjusted under 35 U.S.C. 154(b) by 0 days.

(21) Appl. No.: 10/674,465

(22) Filed: Oct. 1, 2003

(65) Prior Publication Data

US 2004/0067815 A1 Apr. 8, 2004

(30) Foreign Application Priority Data

Oct. 5, 2002 (JP) .................................. 2002-327585

(51) Int. Cl.$^7$ ........................... F16H 3/44; F16H 37/06; F16H 3/08
(52) U.S. Cl. .................. 475/302; 475/330; 74/329
(58) Field of Search ........................... 475/221, 302–3, 475/323, 325, 330; 74/329, 333

(56) References Cited

U.S. PATENT DOCUMENTS

| | | | | |
|---|---|---|---|---|
| 3,433,096 A | * | 3/1969 | Fisher et al. ................. | 475/39 |
| 4,509,389 A | * | 4/1985 | Vahratian et al. ............ | 475/66 |
| 5,013,289 A | * | 5/1991 | Van Maanen ............... | 475/286 |
| 5,106,352 A | | 4/1992 | Lepelletier ................. | 475/280 |
| 5,167,592 A | * | 12/1992 | Sakamoto .................. | 475/277 |
| 5,267,913 A | * | 12/1993 | Beim et al. ................. | 475/218 |
| 5,396,968 A | * | 3/1995 | Hasebe et al. .............. | 475/150 |

FOREIGN PATENT DOCUMENTS

| | | | | |
|---|---|---|---|---|
| EP | 0 434 525 | 7/1994 | | |
| JP | 362177337 A | * | 8/1987 | ................. 74/331 |
| JP | 4-219553 | 8/1992 | | |
| JP | 2001-221301 | 8/2001 | | |

* cited by examiner

*Primary Examiner*—Roger Pang
(74) *Attorney, Agent, or Firm*—Armstrong, Kratz, Quintos, Hanson & Brooks, LLP

(57) ABSTRACT

An automatic speed change apparatus including an input shaft, an intermediate shaft and an output shaft arranged in parallel. The input shaft is coupled to the intermediate shaft by counter gear sets providing first, second and third drive paths. The input shaft is provided with clutches for engaging or disengaging the second and third drive paths and with a brake. The intermediate shaft is provided with a clutch, a brake and a one-way clutch for engaging, disengaging or braking the first and third drive path and with planetary gear sets. The first drive path is coupled to a ring gear, the second drive path is coupled to sun gears, and the third drive path is coupled to a planetary carrier. A planetary carrier and a ring gear are connected to the intermediate shaft, and the intermediate shaft is coupled to the output shaft by a fourth counter gear set.

8 Claims, 9 Drawing Sheets

| COUNTER GEAR SET | 1/REDUCTION GEAR RATIO | NUMBER OF TEETH OF COUNTER GEAR | |
|---|---|---|---|
| | | FIRST SHAFT | SECOND SHAFT |
| 1 | $a_1 = Z_{11}/Z_{12} = 0.628$ | $Z_{11}=54$ | $Z_{12}=86$ |
| 2 | $a_2 = Z_{21}/Z_{22} = 0.687$ | $Z_{21}=57$ | $Z_{22}=83$ |
| 3 | $a_3 = Z_{31}/Z_{32} = 1$ | $Z_{31}=70$ | $Z_{32}=70$ |

| PLANETARY GEAR SET | TOOTH NUMBER RATIO | NUMBER OF TEETH SUN GEAR | NUMBER OF TEETH RING GEAR |
|---|---|---|---|
| 1 | $\rho_1 = Z_{S1}/Z_{R1} = 0.552$ | $Z_{S1}=37$ | $Z_{R1}=67$ |
| 2 | $\rho_2 = Z_{S2}/Z_{R2} = 0.463$ | $Z_{S1}=31$ | $Z_{R2}=67$ |

Fig 8

| SHIFT | ENGAGED | RATIO | STEP | RANGE |
|---|---|---|---|---|
| 1st | C1, B1 | 4.369 | >1.768 | >6.387 |
| 2nd | C1, B2 | 2.471 | >1.588 | |
| 3rd | C1, C2 | 1.556 | >1.345 | |
| 4th | C1, C3 | 1.157 | >1.334 | |
| 5th | C2, C3 | 0.867 | >1.268 | |
| 6th | B2, C3 | 0.684 | | |
| Rev | C2, B1 | 3.231 | | |

| COUNTER GEAR SET | 1/REDUCTION GEAR RATIO | NUMBER OF TEETH OF COUNTER GEAR | |
|---|---|---|---|
| | | FIRST SHAFT | SECOND SHAFT |
| 1 | $a_1 = Z_{11}/Z_{12} = 0.628$ | $Z_{11}=54$ | $Z_{12}=86$ |
| 2 | $a_2 = Z_{21}/Z_{22} = 0.591$ | $Z_{21}=52$ | $Z_{22}=88$ |
| 3 | $a_3 = Z_{31}/Z_{32} = 0.944$ | $Z_{31}=68$ | $Z_{32}=72$ |

| PLANETARY GEAR SET | TOOTH NUMBER RATIO | NUMBER OF TEETH SUN GEAR | NUMBER OF TEETH RING GEAR |
|---|---|---|---|
| 1 | $\rho_1 = Z_{S1}/Z_{R1} = 0.552$ | $Z_{S1}=37$ | $Z_{R1}=67$ |
| 2 | $\rho_2 = Z_{S2}/Z_{R2} = 0.463$ | $Z_{S1}=31$ | $Z_{R2}=67$ |

Fig 11

| SHIFT | ENGAGED | RATIO | STEP | RANGE |
|---|---|---|---|---|
| 1st | C1, B1 | 4.369 | >1.768 | >6.035 |
| 2nd | C1, B2 | 2.471 | >1.522 | |
| 3rd | C1, C2 | 1.623 | >1.345 | |
| 4th | C1, C3 | 1.206 | >1.334 | |
| 5th | C2, C3 | 0.904 | >1.249 | |
| 6th | B2, C3 | 0.724 | | |
| Rev | C2, B1 | 3.632 | | |

AUTOMATIC SPEED CHANGE APPARATUS

BACKGROUND OF THE INVENTION

1. Field of the Invention

The present invention relates to automatic speed change apparatus wherein drive paths connected to a plurality of elements of planetary gear sets are controlled by hydraulic clutches and brakes and, more particularly, to a front-wheel-drive automatic speed change apparatus comprising an input shaft, an intermediate shaft and an output shaft which are arranged in parallel, with a differential gear provided on the output shaft.

2. Description of the Related Art

Four-forward-speed, one-reverse-speed speed change apparatuses are known which have incorporated therein a torque converter having a lockup clutch as passenger motor vehicle automatic transmissions which are most prevalently used. Front-wheel-drive four-forward-speed, one-reverse-speed automatic speed change apparatuses generally comprise a first shaft coaxial with an engine and provided via a torque converter with three clutches, two brakes, two planetary gear sets and a one-way clutch, and further comprise a transmission having an intermediate shaft and an output shaft, such that power is transmitted via counter gears and the second shaft, i.e., the intermediate shaft, to the third shaft serving as the output shaft.

The gear ratio of the speed change apparatus is dependent on the maximum traction force and the maximum speed of the motor vehicle, and the greater the number of speeds, the more advantageous the traction characteristics and fuel consumption. However, the apparatus then has the drawbacks of becoming more complex, lower in transmission efficiency, more costly and greater in axial length. For this reason, increases in the number of speeds available for front-wheel-drive automatic speed change apparatus are from three forward speeds, one reverse speed to four forward speeds, one reverse speed, namely only to such a number of speeds which can be achieved by additionally using a single clutch only without entailing a substantial increase in the axial length.

Conventionally used for giving three forward speeds and one reverse speed is an arrangement of two planetary gear sets which is small in the load on the gear tooth faces and highly efficient and in which a sun gear is coupled to a sun gear, with a planetary carrier connected to a ring gear, to give the input to the ring gear for forward speeds. Nevertheless, the planetary gear set wherein the input is given to a sun gear, and the load on the gear tooth faces is great because of a small diameter is used in the four-forward-Speed, one-reverse-speed automatic speed change apparatus in place of the above arrangement because the single drive path to be additionally installed in the apparatus will interfere with the above gear train arrangement.

The apparatus requires only one additional clutch, whereas if the elements of the apparatus are arranged concentrically on the first shaft, this imposes a limitation on the shortening of the axial length of the apparatus partly because of the additional provision of the single drive path.

Although the four-forward-speed, one-reverse-speed automatic speed change apparatus is an improvement over three-forward-speed, one-reverse-speed automatic speed change apparatus, the overall gear ratio range obtained by dividing the gear ratio of first speed by the gear ratio of the fourth speed is as small as about 4, while the individual gear steps need to be great, so that the use of the engine at low speeds and the use of lockup of the torque converter for an improved fuel consumption still remain insufficient.

As is well known, environmental problems of the earth have led to strong demands for lower automotive fuel consumptions in recent years, and change-over from gasoline engines to efficient diesel engines appears feasible. Diesel engines are lower than gasoline engines in maximum number of revolutions. Accordingly, it is desired more than ever that an automatic speed change apparatus be adapted to give six forward speeds which involve an overall gear ratio range of at least 5 in order to compensate for the drawback of four-forward-speed, one-reverse-speed devices.

On the other hand, strong demands are also made for higher safety from the collision of vehicles, with the result that the space laterally available in the engine room has become ever smaller due to the provision of reliable side members. Thus, it is desired that the speed change apparatus be further reduced in axial length. Because side members have a larger width when positioned closer to the driver's seat from the viewpoint of strength, it is desirable to provide a shorter length to the intermediate shaft, i.e., the second shaft, which is positioned close to the driver's seat than to the input shaft, i.e., the first shaft.

To overcome these problems, JP-A No. 4-219553 (U.S. Pat. No. 5,106,352 EP 434525), JP-A No. 2001-221301 and U.S. Pat. No. 5,013,289 propose six-forward-speed, one-reverse-speed automatic speed change apparatuses of low cost and high efficiency which comprise two planetary gear sets having four elements, a plurality of counter gear sets which are different in gear ratio, three clutches and two brakes.

JP-A No. 4-219553 discloses a front-wheel-drive speed change apparatus for use with an engine having an elongated shaft. The apparatus has a first shaft provided with a torque converter only, and an output shaft greatly offset to avoid interference with the engine, and an elongated output shaft provided with clutches, planetary gear train and a differential gear. Thus, the apparatus differs from the apparatus of the present invention.

JP-A No. 2001-221301 discloses the combination of the gear ratios of counter gear sets and planetary gear sets, with reference to an embodiment. However, this combination is not applicable to the planetary gear sets for use in the present invention wherein an input is given to the ring gear to obtain first to fourth forward speeds.

These gear train comprise a plurality of counter gears which are subjected to a great radial load, and the radial bearings for the counter gears therefore need to have a high strength, whereas the schematic drawing referred to in the embodiment shows that the bearings for the counter gears of the planetary gear set on the second shaft are provided unsuitably, namely, not provided directly on the second shaft.

U.S. Pat. No. 5,013,289 discloses planetary gear sets which are similar to those of JP-A No. 2001-221301. However, these gear trains are not applicable to the planetary gear sets for use in the present invention wherein an input is provided to the ring gear to obtain first to fourth forward speeds. The disclosed apparatus further has the drawback of being elongated in the axial direction because the bearings for counter gears are retained on a housing and also because three clutches are arranged on a first shaft serving as the input shaft. Additionally, because the counter gear is mounted on a shaft end, the second shaft has the same length as the first shaft. Further in the case where the bearings for the counter gears are held by the housing which is at rest, this mode of supporting the bearings is disadvantageous with respect to efficiency, durability and noise because the bearings are rotating at all times.

With the six-forward-speed, one-reverse-speed automatic speed change apparatus heretofore in use, the parking gear is disposed on the second shaft having a large space and therefore poses no problem, whereas according to U.S. Pat. No. 5,013,289 and JP-A No. 2001-221301, the planetary gear sets are arranged on the second shaft, which therefore has the drawback of becoming elongated when provided with the parking gear.

SUMMARY OF THE INVENTION

A first object of the present invention is to provide a front-wheel-drive speed change apparatus which comprises an input shaft, an intermediate shaft and an output shaft arranged in parallel, the output shaft being provided with a differential gear, and in which planetary gear sets are used for providing an input to a ring gear to afford first to fourth forward speeds that are frequently used, and the gear faces are reduced in load, the apparatus being improved in efficiency, smaller in gear steps than is the case with four-speed automatic speed change devices presently available, a least 5 in overall gear ratio range, and made available as a six-forward-speed, one-reverse-speed automatic speed change apparatus which is greatly shortened in the axial direction so as to give increased rigidity to the side members of the vehicle body almost without entailing any increase in cost to ensure a lower fuel consumption and improved safety from collisions of motor vehicles.

A second object of the invention is to realize an intermediate shaft having a shorter length than the input shaft to ensure an increased installation capacity.

A third object of the invention is to use three counter gear sets to ensure increased freedom to determine gear ratios, the three gear sets being provided with radial bearings of enhanced strength to achieve a higher efficiency and improved durability and to ensure reduced noise.

The present invention provides a speed change apparatus for motor vehicles which comprises: a first shaft for receiving power from a prime mover via a torque converter, a second shaft disposed in parallel to the first shaft for transmitting the power therethrough, a third shaft provided in parallel to the second shaft for delivering the power through a differential gear, first and second planetary gear sets provided on the second shaft and comprising first, second and third elements for receiving power and a fourth element for delivering power therethrough, first, second and third drive paths for connecting the first shaft to the first, second and third elements of the first and second planetary gear sets, first, second and third counter gear sets providing the first, second and third drive paths respectively and each comprising two gears in mesh with each other, clutches C1, C2, C3 provided in the first, second and third drive paths respectively, brakes B2, B1 provided in the respective second and third drive paths for braking the respective second and third elements, a one-way clutch provided in the third drive path for braking the third element only in a direction opposite to the direction of rotation thereof in which power is input, and a fourth counter gear set coupling the second shaft to the third shaft. A ring gear of the first planetary gear set serves as the first element having the first drive path connected thereto, a planetary carrier supporting planetary gears in mesh with the ring gear of the first planetary gear set serves as the fourth element, a sun gear meshing with the planetary gears of the first planetary gear set is joined to a sun gear of the second planetary gear set to provide the second element having the second drive path connected thereto, a planetary carrier supporting planetary gears in mesh with the sun gear of the second planetary gear set serves as the third element having the third drive path connected thereto, a ring gear meshing with the planetary gears of the second planetary gear set serves as the fourth element, the planetary carrier of the first planetary gear set and the ring gear of the second planetary gear set which serve as the fourth elements are joined to the second shaft for transmitting power therethrough, and two of the clutches C1, C2, C3 for controlling the first, second and third drive paths, the brakes B2, B1 and the one-way clutch are selectively engaged to thereby realize an efficient six-forward-speed, one-reverse-speed automatic speed change apparatus. The apparatus thus incorporates therein planetary gear sets wherein a ring gear input is given to obtain first to fourth forward speeds that are frequently used.

The axial length of the automatic speed change apparatus is dependent on the arrangement of elements, especially the arrangement of clutches which have an increased axial length for supplying oil to the rotating shafts. To make the second shaft shorter than the first shaft, two of the three clutches are provided on the first shaft, and one clutch is disposed on the second shaft. To realize this arrangement, the first, second and third drive paths for coupling the first shaft to the second shaft are arranged in this order in the direction of the torque converter, the first planetary gear set is disposed on the second shaft between the first and second drive paths, the second planetary gear set is disposed on the second shaft between the second and third drive paths, the clutch C1 provided in the first drive path, and the brake B1 and the one-way clutch provided in the third drive path are arranged on the second shaft, the clutch C2 and the brake B2 provided in the second drive path and the clutch C3 provided in the third drive path are arranged on the first shaft, and the fourth counter gear set coupling the second shaft to the third shaft is disposed closer to the torque converter than the first drive path.

The first, second and third elements included in the first and second planetary gear sets for receiving power input and the fourth elements of the sets for delivering power are arranged as follows. The ring gear serving as the first element of the first planetary gear set is held between the planetary carrier of the first planetary gear set and the counter gear provided on the second shaft and included in the first counter gear set by a plate connected to the ring gear by means of a thrust bearing, the two sun gears joined together and providing the second element are integral with the counter gear provided on the second shaft and included in the second counter gear set providing the second drive path, the planetary carrier of the second planetary gear set serving as the third element is supported by a bush on the second shaft and connected to the counter gear provided on the second shaft and included in the third counter gear set providing the third drive path by a joint at an outer peripheral portion of the second planetary gear set, the planetary carrier of the first planetary gear set and the ring gear of the second planetary gear set which serve as the fourth elements are splined to the second shaft for transmitting power therethrough respectively at different positions, and a spline hub of the ring gear, connected to the second shaft, of the second planetary gear set has splined bore opposite end portions fitting around the second shaft so as to be coaxial therewith.

The first, second and third counter gear sets, each comprising two gears in mesh with each other, are so supported as described below for providing the first, second and third drive paths. The counter gear on the first shaft of the first counter gear set is integral with the first shaft, and the counter gear on the second shaft meshing with the above counter gear is rotatably held by a needle roller bearing on the second shaft, the counter gear on the first shaft of the second counter gear set is rotatably held by a needle roller bearing on the first shaft, and the counter gear on the second shaft meshing with this counter gear is rotatably held by a needle roller bearing on the second shaft, the counter gear on the first shaft of the third counter gear set is rotatably held by a needle roller bearing on the first shaft, and the counter gear on the second shaft meshing with this counter gear is rotatably held by a needle roller bearing on the spline hub integral with the ring gear of the second planetary gear set, the ring gear having the splined bore opposite end portions fitting around the second shaft so as to be coaxial therewith, the counter gear of the first counter gear set integral with the first shaft has an inner periphery thereof supported by a cylindrical roller bearing on a support fixed to a housing of the speed change apparatus to thereby support the first shaft, and the first shaft is supported by a boss portion integral with the housing of the speed change apparatus by means of needle roller bearings, and the second shaft has opposite ends thereof supported respectively by tapered roller bearings on a torque converter housing and a rear cover which are fixed to the housing of the apparatus. This shortens the axial length of the apparatus, further realizing a bearing arrangement of high strength.

The clutches C1, C2, C3 for controlling the respective first, second and third drive paths and the brakes B2, B1 are hydraulic actuators having first, second, third, fourth and fifth friction members, piston and piston return springs respectively, and the one-way clutch for controlling the third drive path is a mechanical actuator. The clutch C1 provided on the second shaft has the first friction members arranged at an outer peripheral portion of the first planetary gear set, a connecting-holding member welded to the counter gear on the second shaft of the first counter gear set and holding one of the first friction members, the first piston and the first return spring which are held by the counter gear, and an outer peripheral connecting portion of the ring gear for holding the other first friction member, the brake B1 provided on the second shaft has the fifth friction members arranged at an outer peripheral portion of the second planetary gear set, a connecting-holding member of the housing for holding one of the fifth friction members, the fifth piston held by the rear cover supporting the tapered roller bearing and having a cutout at a portion thereof to be interfered with by the counter gear, the fifth return spring, and a connecting-holding member extending from the planetary carrier of the second planetary gear set for holding the other fifth friction member, the one-way clutch provided on the second shaft having an inner race connected to the rear cover holding the piston of the brake B1 and an outer race provided by the inside of an outer peripheral portion of the counter gear on the second shaft of the third counter gear set, the clutch C2 provided on the first shaft has the second friction members arranged at the same position as the first friction members of the clutch C1 on the second shaft with respect to the axial direction, a connecting-holding member welded to the counter gear on the first shaft of the first counter gear set and holding one of the second friction members, the second piston and the second return spring which are held by the first shaft and the counter gear on the first shaft of the first counter gear set, and a connecting-holding member welded to the counter gear on the first shaft of the second counter gear set and holding the other second friction member, the brake B2 provided on the first shaft has the fourth friction members arranged at the same position as the fifth friction members of the brake B1 on the second shaft with respect to the axial direction, a connecting-holding member of the housing for holding one of the fourth friction members, the fourth piston and the fourth return spring which are held by the boss portion and the wall portion, and a connecting-holding member welded to the counter gear on the first shaft of the second counter gear set and holding the other fourth friction member, and the clutch C3 provided at the end portion of the first shaft opposite to the torque converter has a clutch case splined to the first shaft, one of the third friction members held by the clutch case, the third piston and the third return spring which are held by the clutch case, and a connecting-holding member welded to the counter gear on the first shaft of the third counter gear set and holding the other third friction member. The first shaft and the second shaft can be shortened by the arrangement described and also by providing the cylinder of the clutch C1 on the counter gear on the second shaft of the first counter gear set, and the cylinder of the clutch C2 on the counter gear on the first shaft of the first counter gear set.

The reduction gear ratios of the respective first, second and third counter gear sets providing the first, second and third drive paths obtained by dividing the numbers of teeth of the counter gears on the second shaft by the respective numbers of teeth of the counter gears on the first shaft and meshing therewith are so determined that the first counter gear set and the second counter gear set are the same or different in reduction gear ratio, and the third counter gear set is smaller than the first and second counter gear sets in reduction gear ratio. Accordingly, by selecting counter gears only which are readily changeable, a six-forward-speed, one-reverse-speed automatic speed change apparatus can be realized which is at least 5 in overall gear ratio and wherein the individual gear steps can be determined with increased freedom.

Inlets to the first shaft of first and second oil channels for guiding a hydraulic oil to the clutches C2, C3 on the first shaft are formed by circumferential grooves in an outer periphery of the first shaft and three rotating seal rings around the outer periphery and in contact with an inner peripheral portion of the support fixed to the housing of the speed change apparatus, an inlet to the first shaft of an third oil channel for guiding a supply oil of low pressure to bearings, etc. arranged for the first shaft is formed in side portions of the support and the counter gear integral with the first shaft, by one rotating seal ring in contact with an inner peripheral portion of the counter gear and disposed around the support for the cylindrical roller bearing, a circumferential groove formed in the outer periphery of the first shaft and a rotating seal ring adjacent to above-mentioned one rotating seal ring, and an inlet to the second shaft of an fourth oil channel for guiding a hydraulic oil to the clutch C1 on the second shaft and an inlet to the second shaft of an fifth channel for guiding a supply oil of low pressure to bearings, etc. arranged for the second shaft are formed in a stepped bore formed in the second shaft at one end thereof, closer to the torque converter, where the tapered roller bearing is positioned, the inlets being defined by two rotating seal rings which are provided around an outer periphery of stepped portion of a channel-attached member fastened to the torque converter housing and which are in contact with respective two portions, having different diameters, of an inner periphery of the shaft end defining the stepped bore, the inlets being formed in an upper part of the stepped bore and in the center of the stepped bore. Thus, the inlets of oil for the shafts are all positioned at the junction of the apparatus housing and the torque converter housing, and the inlets of the oil channels are provided in shaft side faces. The housing and the first and second shafts can therefore be shortened.

A parking gear is not provided on the second shaft but is formed on a counter gear having a large diameter and mounted on the third shaft serving as an output shaft, so that the parking gear can be disposed at an outer peripheral portion of the bearing for the third shaft. This gives a reduced length to the overall speed change apparatus without elongating the second and third shafts.

BRIEF DESCRIPTION OF THE DRAWINGS

FIG. 8 is a table showing arresting elements and gear ratios for respective speeds of the first embodiment;

FIG. 11 is a table showing arresting elements and gear ratios for respective speeds of the second embodiment.

DESCRIPTION OF THE PREFERRED EMBODIMENTS

Figure 1:
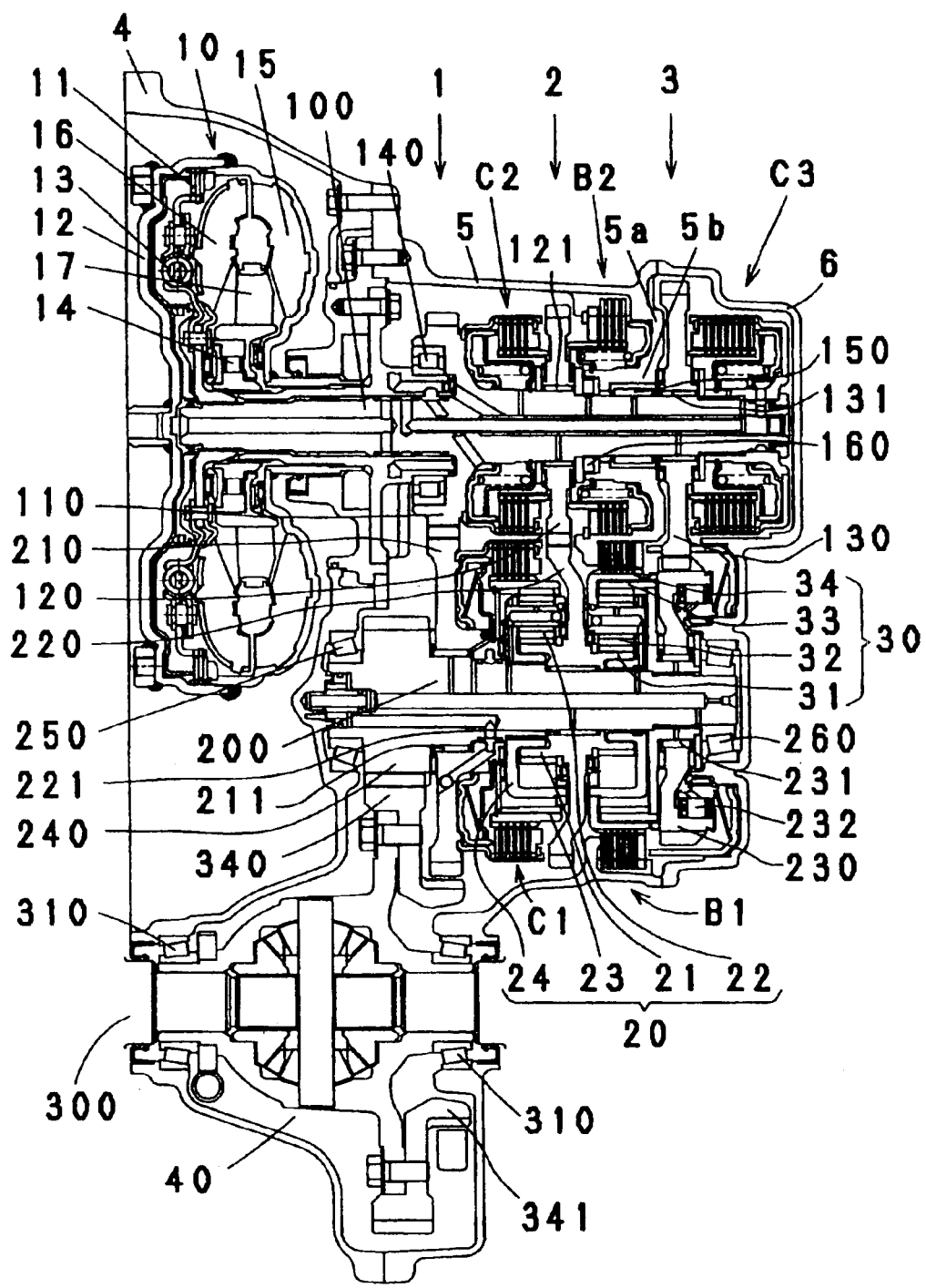
FIG. 1 is a view showing the construction of an automatic speed change apparatus of the invention.
Figure 2:
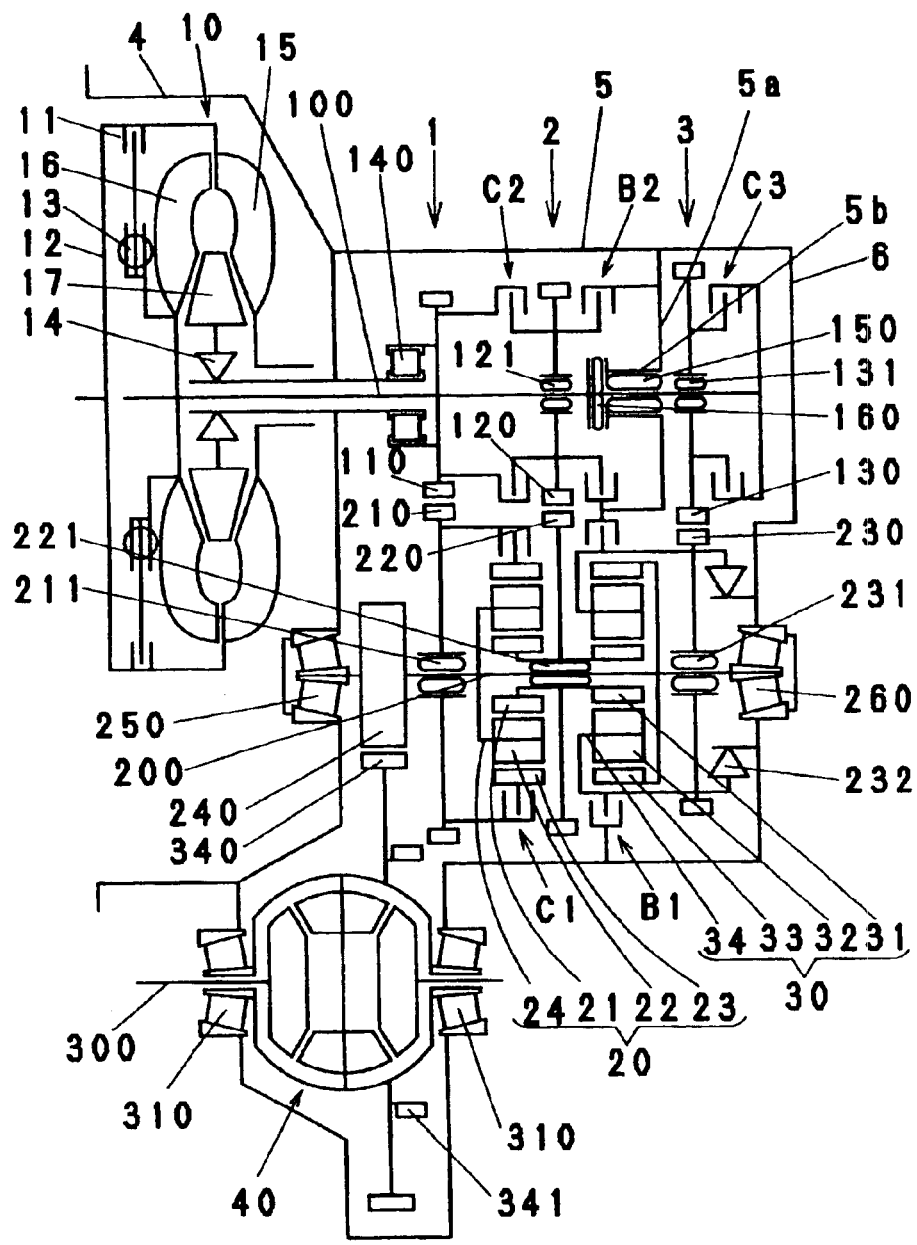
FIG. 2 is a schematic drawing showing gear train of FIG. 1.

An automatic speed change apparatus is shown in FIG. 1 and FIG. 2 which schematically shows FIG. 1.

With reference to these drawings, a torque converter housing 4 fastened to an engine is connected to a housing 5 of the speed change apparatus and a rear housing 6 with bolts. A torque converter 10 for receiving power from the engine is accommodated in the housing 4. The speed change apparatus positioned in the rear of the output side of the torque converter 10 is accommodated in the housing 5 and the rear housing 6. A control hydraulic pump case is fixedly provided between the torque converter housing 4 and the apparatus housing 5. The hydraulic pump case supports the torque converter 10 and separates the converter housing 4 which is in a dry state from the apparatus housing 5 which is in a wet state.

The torque converter 10 has a front cover 12, impeller 15, turbine 16, stator 17 provided with a one-way clutch 14, lockup clutch 11 and a torsion damper 13.

As is well known, when the lockup clutch 11 is in a disengaged state, the power from the engine is transmitted by the impeller 15, turbine 16 and stator 17 using a fluid. When the clutch 11 in an engaged state, the power is directly transmitted by efficient mechanical means via the torsion damper 13. In either case, the power is output from the turbine 16 to a first shaft 100.

The speed change apparatus comprises the first shaft 100 for receiving a power input via the torque converter 10, a second shaft 200 disposed in parallel to the first shaft 100 for transmitting power therethrough, a third shaft 300 provided in parallel to the second shaft 200 for delivering power through a differential gear 40, first and second planetary gear sets 20, 30 provided on the second shaft 200 and comprising first, second and third elements for receiving power and a fourth element for delivering power therethrough, first, second and third drive paths for connecting the first shaft 100 to the respective first, second and third elements of the first and second planetary gear sets 20, 30, first, second and third counter gear sets 1, 2, 3 each comprising two gears in mesh with each other and providing the first, second and third drive paths respectively, clutches C1, C2, C3 provided in the first, second and third drive paths respectively, brakes B2, B1 provided in the second and third drive paths respectively for braking the second and third elements, a one-way clutch 232 provided in the third drive path for braking the third element only in a direction opposite to the direction of rotation in which power is input, and a fourth counter gear set coupling the second shaft 200 to the third shaft 300.

Figure 3:
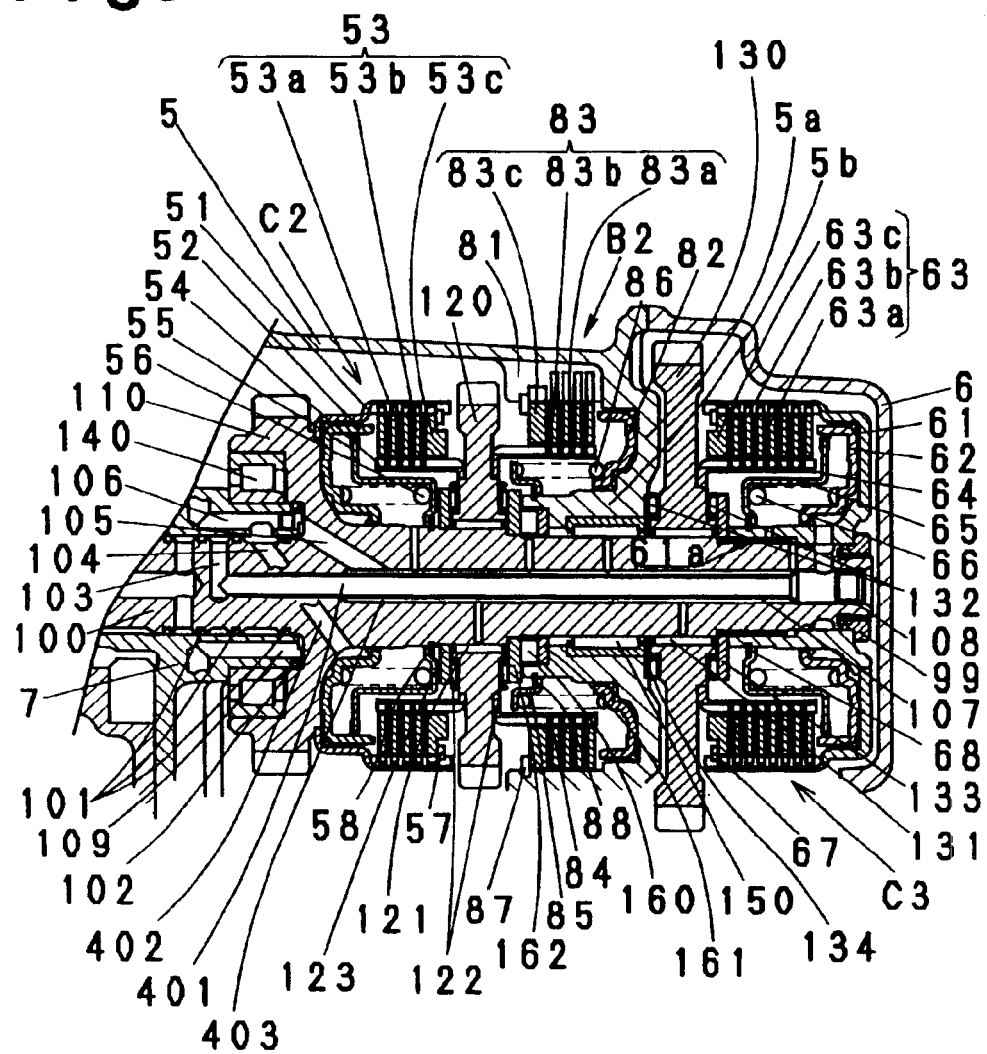
FIG. 3 is a view showing a first shaft of FIG. 1 in detail.

With reference to FIG. 1, FIG. 2 schematically showing FIG. 1 and FIG. 3 showing the first shaft 100 of FIG. 1 in detail, the first shaft 100 has a counter gear 110 constituting the first counter gear set 1, a counter gear 120 constituting the second gear set 2, a counter gear 130 constituting the third counter gear set 3, the clutch C2 for engaging the first shaft 100 with the counter gear 120 or disengaging the shaft 100 from the gear 120, the brake B2 for braking the counter gear 120 and the clutch C3 for engaging the first shaft 100 with the counter gear 130 or disengaging the shaft 100 from the gear 130.

The first shaft 100 is integral with the counter gear 110, has a length almost equal to the overall length of the automatic speed change apparatus from the torque converter 10 in the front to the rear end of the apparatus in the rear, and is supported by a cylindrical roller bearing 140 and needle roller bearings 150, 160 on the housing 5.

The cylindrical roller bearing 140 is provided between the outer periphery of a pump case support 7 fixed to a front portion of the housing 5 and the inner periphery of the counter gear 110, and the inner race of the bearing has a front flange for receiving a radial load and a thrust load acting on the front portion of the first shaft 100.

The needle roller bearings 150, 160 are provided on a wall portion 5a and a boss portion 5b of the housing 5 positioned at the rear end thereof. The bearing 150 receives a radial load, and a thrust washer 161 is fixed to the boss portion 5b and a thrust washer 162 is fixed to the first shaft 100 so that the bearing 160 receives a thrust load acting on a rear portion of the first shaft 100.

The clutch C2 has second friction members 53, a clutch case 51 welded to the counter gear 110 and serving as a connecting-holding member for holding one of the second friction members 53, a second piston 52, a second return spring 56, and a clutch hub 54 welded to the counter gear 120 and serving as a connecting-holding member for holding the other second friction member 53. The clutch C2 brings the first shaft 100 into or out of engagement with the counter gear 120.

The clutch case 51 is tubular and welded to an outer peripheral portion of the counter gear 110 and has a plurality of driven plates 53b providing one of the second friction members 53, splined to the inner periphery of the case 51 against rotation and held to the case axially movably.

Alternately arranged with the driven plates 53b are drive plates 53a providing the other friction member. An end plate 53c is fixed to an end portion of the clutch case 51 by a retaining ring 57.

The clutch hub 54 is cylindrical, welded to a side portion of the counter gear 120 and provided with the drive plates 53a splined to the outer periphery of the hub against rotation and held thereto axially movably.

The piston 52 is accommodated in a cylinder formed by the counter gear 110 and the clutch case 51 and is returned toward the disengaging side by the return spring 56.

The return spring 56 is retained by a plate 55 forming a centrifugal hydraulic canceler chamber of the piston 52. The plate 55 is fixed to the first shaft 100 by a retaining ring 58.

The second counter gear 120 of the second counter gear set 2 is disposed in the rear of the clutch C2 and rotatably supported on the first shaft 100 by a needle roller bearing 121 serving as a radial bearing, needle roller bearings 122 serving as thrust bearings and thrust washers 123, 162.

The brake B2 is disposed in the rear of the counter gear 120 and has fourth friction members 83, a connecting-holding member 81 of the housing 5 for holding one of the fourth friction members 83, a fourth piston 82, a fourth return spring 86, and a brake hub 84 welded to the counter gear 120 and serving as a connecting-holding member for holding the other fourth friction member 83. The brake B3 brakes the counter gear 120.

The connecting-holding member 81 of the housing 5 has a plurality of grooves formed in its inner periphery and a plurality of driven plates 83b providing one of the fourth friction members 83 and retained thereon against rotation but axially movably. Alternately arranged with the driven plates 83b are drive plates 83a providing the other friction member. An end plate 83c is fixed to an end portion of the connecting-holding member 81 by a retaining ring 87.

The brake hub 84 is cylindrical, welded to a side portion of the counter gear 120 and provided with the drive plates 83a splined to the outer periphery of the hub against rotation and held thereto axially movably.

The piston 82 is accommodated in a cylinder formed by the rear end wall portion 5a of the housing 5 integral with the connecting-holding member 81 and the boss portion 5b, and is returned toward the disengaged side by the return spring 86.

The return spring 86 is fixed to the boss portion 5b by a retaining ring 88 and a plate 85.

The counter gear 130 of the third counter gear set 3 is disposed in the rear housing 6 in the rear of the housing 5 and rotatably supported on the first shaft 100 by a needle roller bearing 131 serving as a radial bearing, needle roller bearings 132 serving as thrust bearings and thrust washers 133, 134.

The clutch C3 has third friction members 63, a clutch case 61 splined to the first shaft 100 holding one of the third friction members 63, a third piston 62, a third return spring 66, and a clutch hub 64 welded to the counter gear 130 and serving as a connecting-holding member for holding the other third friction member 63. The clutch C3 brings the first shaft 100 into or out of engagement with the counter gear 130.

The clutch case 61 is in the form of a double cylinder and has an inner cylinder splined to the first shaft 100 and fixed thereto by the thrust washer 133 and also by a nut 99 disposed at the rear end of the first shaft 100. A plurality of driven plates 53b providing one of the third friction members 63 are splined to the inner periphery of the clutch case 61 against rotation and held to the case axially movably.

Alternately arranged with the driven plates 63b are drive plates 63a constituting the other friction member. An end plate 63c is fixed to an end portion of the outer cylinder of the clutch case 61 by a retaining ring 67.

The clutch hub 64 is cylindrical, welded to a side portion of the counter gear 130 and provided with the drive plates 63a splined to the outer periphery of the hub against rotation and held thereto axially movably.

The piston 62 is accommodated in the clutch case 61 and is returned toward the disengaging side by the return spring 66.

The return spring 66 is retained by a plate 65 forming a centrifugal hydraulic canceler chamber of the piston 62. The plate 65 is fixed to the clutch case 61 by a retaining ring 68.

Inlets to the first shaft 100 of first and second oil channels 401, 402 for guiding a hydraulic oil to the clutches C2, C3 arranged for the first shaft 100 are formed by circumferential grooves in the outer periphery of the first shaft and three rotating seal rings 101 around the outer periphery and in contact with an inner peripheral portion of the support 7 which is fixed to the housing 5. The hydraulic oil, supplied from an unillustrated control valve and having a pressure of 6 to 15 kg/cm$^2$, is guided from an oil channel 106 formed in the support 7 to one of the inlets to the shaft 100 which inlet is closed by the seal rings 101, passed through a slanting oil channel 104 formed in the first shaft 100, i.e. through the second oil channel 402, and supplied directly to the cylinder chamber of the clutch C2. Similarly, the hydraulic oil to be supplied to the cylinder chamber of the clutch C3 is sent out from an unillustrated oil channel formed in the support 7, guided to another one of the inlets to the first shaft 100, passed through an oil channel 103 in communication with the first oil channel 401 which is provided by a pipe 107 and an oil stopper 108, and supplied to the cylinder chamber of the clutch C3.

An third oil channel 403 for guiding a supply oil of low pressure to the bearings, etc. arranged for the first shaft 100 has an inlet to the first shaft 100 which inlet communicates with an oil channel 109 in the support 7 and is formed in side portions of the support 7 and the counter gear 110 by a rotating seal ring 102 in contact with an inner peripheral portion of the counter gear 110 and disposed around the support 7 for the cylindrical roller bearing 140, a circumferential groove formed in the outer periphery of the first shaft 100 and the rotating seal ring 101 immediately adjacent to the seal ring 102. The supply oil, which is supplied from an unillustrated control valve and having a pressure of about 1 kg/cm$^2$, is guided to the inlet formed in the side portions of the support 7 and the counter gear 110 and sealed off by the rings 101, 102, led through an oil channel 105 and then through an third oil channel 403 formed around the pipe 107 in the center of the first shaft 100 and separated from the first oil channel 401 by the pipe 107, and fed to a plurality of locations. The inlet formed in the side portions of the support 7 and the gear 110 serves to shorten the first shaft 100. Although the oil causes a thrust load to act on the side portion of the counter gear 110, the oil has a low pressure, therefore acts as a small load and poses no problem.

Figure 4:
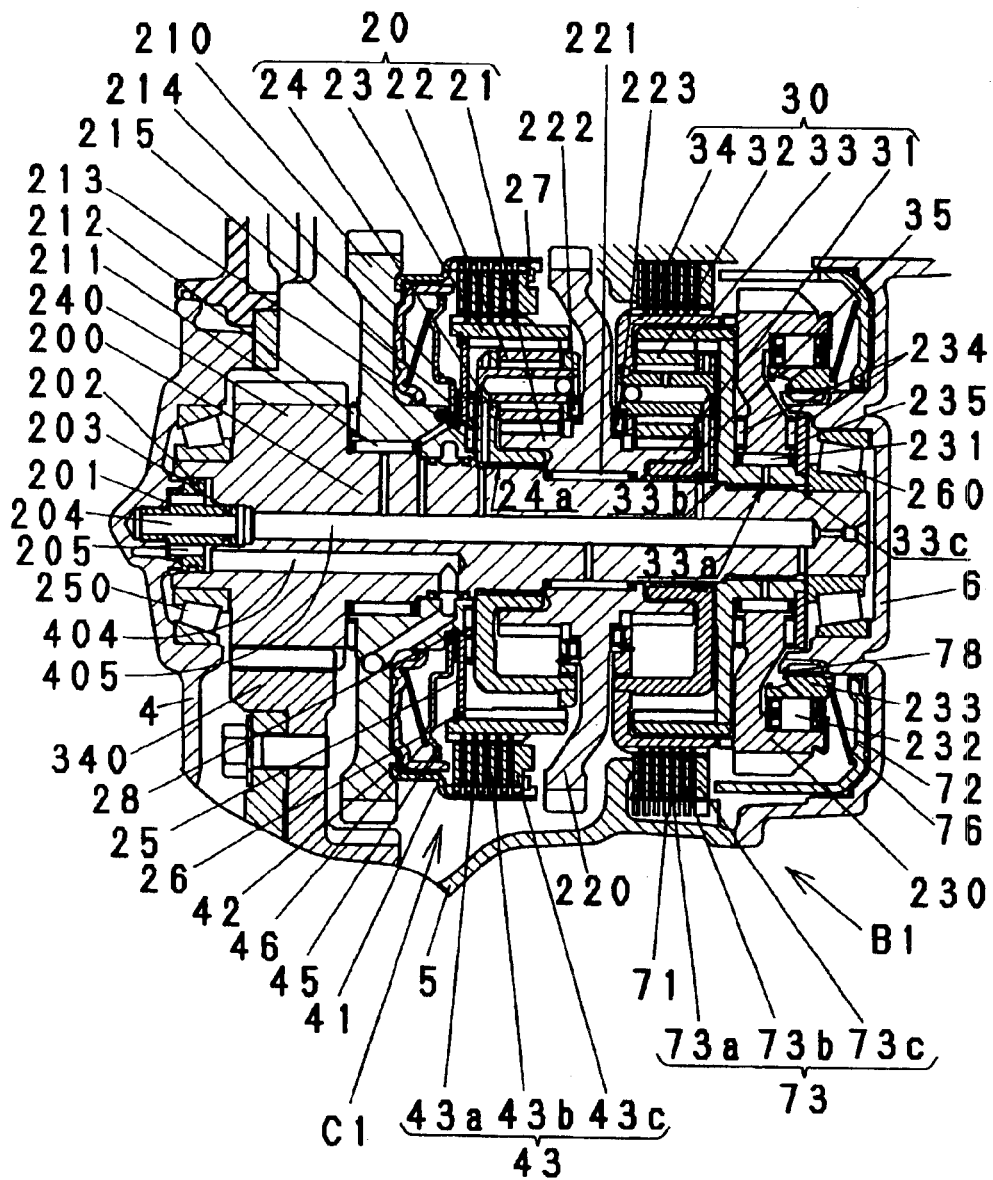
FIG. 4 is a view showing a second shaft of FIG. 1 in detail.

With reference to FIG. 1, FIG. 2 schematically showing FIG. 1 and FIG. 4 showing the second shaft 200 of FIG. 1 in detail, inlets to the shaft 200 for a hydraulic oil having a pressure of 6 to 15 kg/cm$^2$ and to be supplied from an unillustrated control valve and for a supply oil having a low pressure of about 1 kg/cm$^2$ and to be supplied to bearings, etc. are formed in a stepped bore formed in the second shaft 200 at one end thereof where a tapered roller bearing 250 is positioned. The inlets are defined by two rotating seal rings 202, 203 which are provided around the outer periphery of stepped portion of a channel-attached member 201, for example, sealed off and fastened to the torque converter housing 4 with screws and which are in contact with respective two portions, having different diameters, of an inner periphery of the shaft end defining the stepped bore. The inlets are formed in an upper part of the stepped bore and in the center of the stepped bore.

The hydraulic oil flows through an oil channel 205 in the channel-attached member 201 and the inlet at the bore upper part, is guided to an fourth oil channel 404 in the second shaft and is supplied to a cylinder of the clutch C1 provided on the counter gear 210 with a rotating seal ring interposed therebetween. The supply oil of low pressure is passed through an oil channel 204 in the member 201 and the inlet in the bore center, led through an fifth oil channel 405 and supplied to a plurality of locations. Since the channel-attached member 201 which is compact is disposed radially inwardly of the tapered roller bearing 250, the second shaft has a reduced length. Although the oil applies a thrust load to the second shaft 200 opposed to the side portion of the member 201, the pressure bearing face is small, hence no problem.

The second shaft 200 has the counter gear 210 constituting the first counter gear set 1, a counter gear 220 constituting the second counter gear set 2, a counter gear 230 constituting the third counter gear set 3, first and second planetary gear sets 20, 30 each having first, second and third elements for receiving power from the first, second and third counter gear sets 1, 2, 3 and a fourth element for delivering power, the clutch C1 for bringing the counter gear 21—into or out of engagement with a ring gear 23 of the first element of the first planetary gear sets 20, a brake B1 for braking a planetary carrier 34 serving as the third element of the second planetary gear set 30, a one-way clutch 232 for braking the planetary carrier 34 in only one direction opposite to the direction of rotation for the input of power, and a counter gear 240 constituting a fourth counter gear set.

The second shaft 200 is supported by the tapered roller bearings 250, 260 on the torque converter housing 4 and the rear housing 6 which are joined to the housing 5.

The tapered roller bearing 250 is disposed between the housing 4 and the front end of the second shaft 200 and faces inward toward the speed change apparatus. The tapered roller bearing 260 is disposed between the rear housing 6 and the rear end of the second shaft 200 and faces inward toward the speed change apparatus. The first, second, third and fourth counter gear sets receive a radial load and a thrust load acting on the second shaft 200.

The counter gear 210 meshing with the counter gear 110 constituting the first counter gear set 1 is disposed at a front portion of the second shaft 200 and rotatably supported on the shaft 200 by a needle roller bearing 211 serving as a radial bearing and needle roller bearings 212, 213 serving as thrust bearings.

The clutch C1 has first friction members 43, a clutch case 41 welded to the counter gear 210 and a serving as a connecting-holding member for holding one of the first friction members 43, a first piston 42, a first return spring 46, and an outer peripheral connecting portion of the first element, i.e., the ring gear 23, of the first planetary gear set 20 for holding the other first friction member 43. The counter gear 210 is brought into or out of engagement with the ring gear 23 by the clutch C1.

The clutch case 41 is tubular and welded to an outer peripheral portion of the counter gear 210 and has a plurality of driven plates 43b providing one of the first friction members 43, splined to the inner periphery of the case 41 against rotation and held to the case axially movably. Alternately arranged with the driven plates 43b are drive plates 43a providing the other friction member. An end plate 43c is fixed to an end portion of the clutch case 41 by a retaining ring 27.

The drive plates 43a are splined to the outer periphery of the ring gear 23 against rotation and held thereon axially movably.

The piston 42 is accommodated in a cylinder formed by the counter gear 210 and the clutch case 41 and is returned toward the disengaging side by the return spring 46 which is dishlike. The return spring 46 is retained by a plate 45 forming a centrifugal hydraulic canceler chamber of the piston 42. The plate 45 is fixed to the counter gear 210 by a retaining ring 28.

The first planetary gear set 20 is disposed in the rear of the counter gear 210 and has the ring gear 23, planetary gears 22 in mesh with the gear 23, the planetary carrier 24 supporting the planetary gears 22 and a sun gear 21 meshing with the planetary gears 22.

The ring gear 23 which is the first element of the first planetary gear set 20 has a plate 25 held to a front portion of the ring gear against rotation and fixed by a retaining ring 26, and is held between the counter gear 210 and the planetary carrier 24 by means of a thrust sliding bearing 215 and needle roller bearing 214.

The planetary carrier 24 which is the fourth element or supporting the planetary gears 22 in mesh with the ring ear 23 is restrained from moving forward by a stepped portion of the second shaft 200 and splined to the second shaft 200 as at 24a.

In the rear of the first planetary gear set 20, the counter gear 220 in mesh with the counter gear 120 is integral with the sun gear 21 and the sun gear 31 of the respective first and second planetary gear sets 20, 30, the sun gears 21, 31 being the second elements of these gear sets.

The counter gear 220 is rotatably retained on the second shaft 200 by a needle roller bearing 221 serving as a radial bearing, and needle roller bearings 222, 223 which serve as thrust bearings.

The second planetary gear set 30 is disposed in the rear of the counter gear 220 and has a ring gear 33, planetary gears 32 in mesh with the gear 33, the planetary carrier 34 supporting the planetary gears 32, and a sun gear 31 meshing with the planetary gears 32.

The ring gear 33 serving as the fourth element has a flange welded thereto and having a splined hub and is splined as at 33a to a rear portion of the second shaft 200 to which power is delivered. The splined portion 33a, i.e., the flange provided radially inwardly of the gear 33, is restrained from moving forward by a stepped portion of the shaft 200, and has a radially outward part 33b with the same diameter as the inner diameter of the needle roller bearing 221 and a radially inward part 33c adjacent to the outer end of the splined portion and having the same diameter as the inside diameter of the tapered roller bearing 260, these parts 33b, 33c fitting around the second shaft 200 so as to be coaxial therewith.

The planetary carrier 34, which is the third element, has a rear side plate provided with an inner peripheral flange which is supported by a bush on the second shaft 200 with the same diameter as the inner diameter of the needle roller bearing 221. The carrier 34 has a front side plate provided with an outer peripheral tubular portion which covers the ring gear 33 and which is connected to the counter gear 230 of the third counter gear set 3 by an end joint with some axial teeth.

The counter gear 230 meshing with the counter gear 130 is disposed in the rear of the second planetary gear set 30, connected to the planetary carrier 34 by an outer peripheral front joint with some axial teeth, and rotatably retained on the flange of the ring gear 33 which flange is joined to the second shaft 200, by a needle roller bearing 231 serving as a radial bearing, needle roller bearings 234 serving as thrust bearings and a thrust washer 235.

The counter gear 230 holds the one-way clutch 232 having an outer race provided by the inside of the outer peripheral portion of the gear 230 and an inner race 233 attached thereto by a retaining ring 78. The rear cover 6 holding the tapered roller bearing 260 has grooves formed in its outer periphery. The clutch 232 functions as a brake acting in a direction opposite to the direction of rotation.

The brake B1 comprises fifth friction members 73 arranged around the second planetary gear set 30, a connecting-holding portion 71 integral with the wall portion 5a of the housing 5 and holding one of the fifth friction members 73, and an outer peripheral connecting portion of the planetary carrier 34 which portion holds the other fifth friction member 73. The brake B1 brakes the planetary carrier 34, i.e., the third element.

The connecting-holding portion 71 of the housing 5 has a front flange for fixing, grooves in its inner periphery, and driven plates 73b retained thereon against rotation but axially movably and providing one of the fifth friction members 73. Arranged alternately between the driven plates 73b are drive plates 73a providing the other fifth friction member 73. A thick plate 73c is provided at one end of the plate arrangement for contact with the piston 72.

The piston 72 has a cutout at the portion thereof to be interfered with by the counter gear 130 and is accommodated in a cylinder formed in the rear cover 6 in the rear of the inner race 233 and returned toward the disengaging side by the spring 76 which is shaped like a dish and provided on the inner race 233.

The return spring 76 is fixed to the inner race 233.

The counter gear 240 of the fourth counter gear set is integral with the second shaft 200 and disposed between the counter gear 210 and the tapered roller bearing 250.

Figure 5:
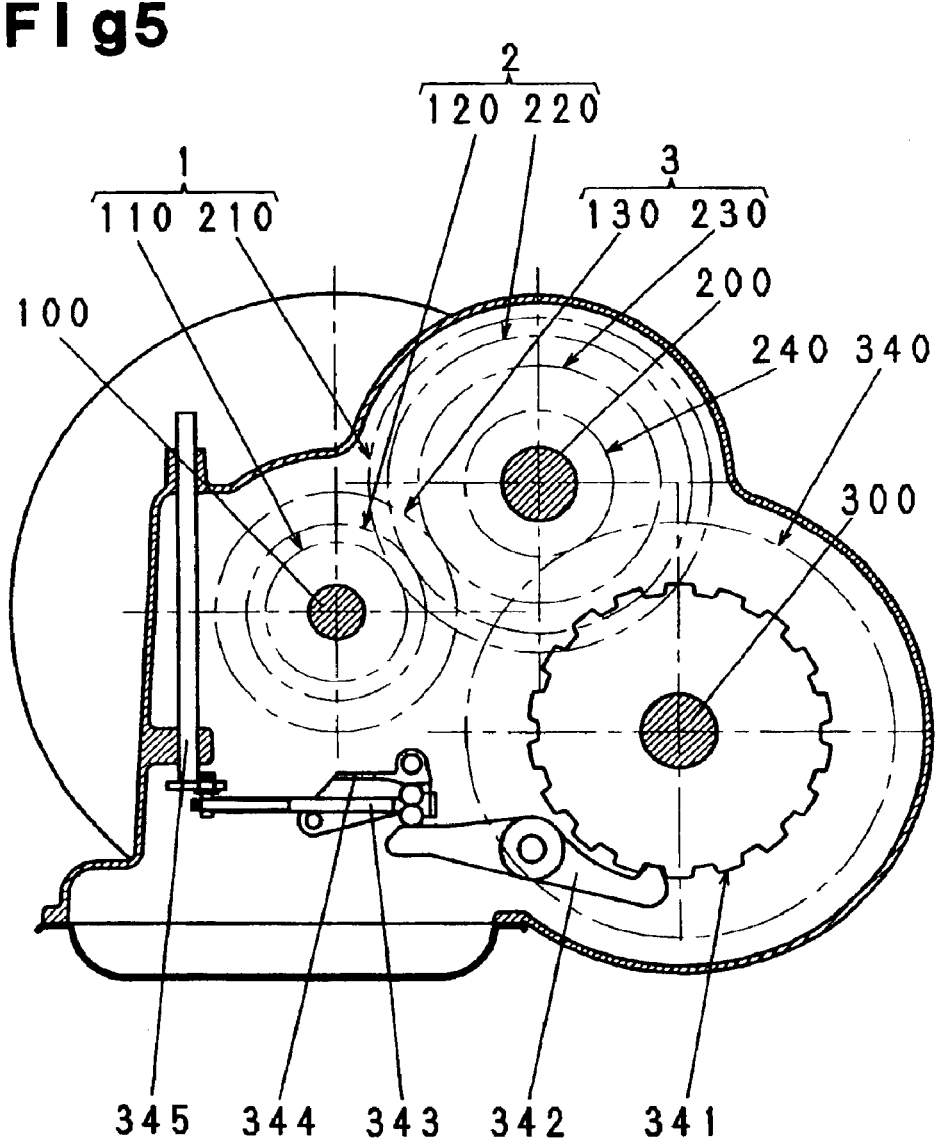
FIG. 5 is a view showing the automatic speed change apparatus of the invention as it is seen from behind toward an engine.

With reference to FIG. 5 showing the automatic speed change apparatus as seen from the rear thereof toward the engine, the second shaft 200 serving as an intermediate shaft for transmitting power therethrough is coupled to the first shaft 100 serving as a power input shaft by the first counter gear set 1 providing a first drive path wherein the counter gears 110 and 210 are meshing with each other, the second counter gear set 2 providing a second drive path wherein the counter gears 120 and 220 are meshing with each other, and the third counter gear set 3 providing a third drive path wherein the counter gears 130 and 230 are meshing with each other. The second shaft 200 is positioned at the right of the first shaft 100 thereabove.

The third shaft 300 serving as a power output shaft is coupled to the second shaft 200 by a fourth counter gear set wherein the counter gear 240 and a counter gear 340 are in mesh with each other. The shaft 300 is positioned at the right of the first shaft 100 therebelow.

With reference to FIGS. 1, 2 and 5, the counter gear 340 on the third shaft 300 is fixed to a differential carrier by bolts and connected to left and right tires by a differential gear.

The counter gear 340 has a parking gear 341 integral therewith and positioned at an outer peripheral portion of the bearing 310 for the third shaft 300. The third shaft 300 coupled to the tires is locked or released by a parking cam 342.

The automatic speed change apparatus has at an unillustrated driver's seat a shift tower which is operatively connected to a select shaft 345. The pivotal movement of the select shaft 345 is converted by a lever to a linear movement of the parking rod 343. The parking rod 343 has two rollers, and the leftward or rightward linear movement of the rod in FIG. 5 causes the rollers to roll along a tapered portion of a parking stay 344 fixed to the housing. The rod moves upward or downward, pivotally moving the parking cam 342. Now, when the shift tower is moved to P range, the parking rod 343 moves rightward, depressing the parking cam 342 and causing a pawl of the cam 342 to engage in a gear portion of the parking gear 341 to lock the vehicle.

Conversely, if the shift tower is moved out of P range, the parking rod 343 moves leftward, causing the torque of the parking gear 341 or an unillustrated spring to disengage the pawl of the cam 342 for unlocking and permitting the travel of the vehicle.

The parking mechanism is a conventional one. In conventional automatic speed change apparatus, the parking gear is mounted on the first shaft or second shaft. If the parking gear is disposed on the third shaft to which the power is delivered upon a speed reduction, an increased load will act on the parking cam, hence a disadvantage. Generally in the case where the second shaft is provided with planetary gear sets as is the case with the present invention, the second shaft becomes elongated if provided with the parking gear. According to the present invention, the parking gear is disposed on the third shaft to give a reduced length to the second shaft. Since the parking gear can be formed integrally with the counter gear 340 having a large diameter and mounted on the third shaft, the load acting on the parking cam 342 can be lessened, while an increased cost will not result. With the parking gear disposed at an outer peripheral portion of the bearing for the third shaft, the third shaft is unlikely to have an increased length.

Embodiments

Figures 6, 7:
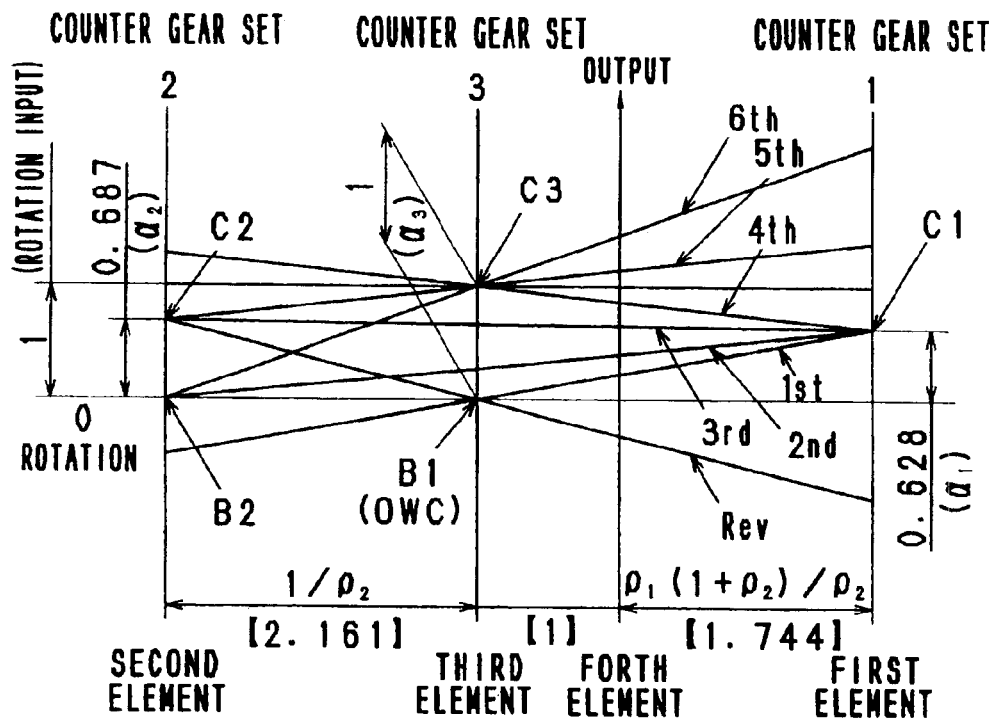
FIG. 6 includes tables showing the specifications of gears of a first embodiment.
FIG. 7 is a speed diagram showing varying speeds of the first embodiment.

FIGS. 6, 7 and 8 show a first embodiment of the invention.

With reference to FIG. 6, the reciprocals $\alpha 1$, $\alpha 2$, $\alpha 3$ of reduction gear ratios of the first, second and third counter gear sets 1, 2, 3 providing the first, second and third drive paths are:

$\alpha 1 = 0.628$ $\alpha 2 = 0.687$ $\alpha 3 = 1$

Thus, the counter gear set 3 is the smallest in reduction gear ratio, and the counter gear set 1 is set at a slightly greater value than the counter gear set 2 in this ratio. Further with the planetary gear sets, the tooth number ratios $\rho 1$, $\rho 2$ of the first and second planetary gear sets 20, 30, each obtained by dividing the number of teeth of the sun gear by the number of teeth of the ring gear, are:

$\rho 1 = 0.552$ $\rho 2 = 0.463$

Thus, the first planetary gear set 20 is set at a slightly greater value.

FIG. 7 is a speed diagram of the first embodiment prepared according to the meshing law of planetary gears. The positions of the first to fourth elements of the first and second planetary gear sets 20, 30 are determined according to the tooth number ratios ρ1, ρ2 of these first and second gear sets 20, 30.

Assuming that the rotational speed to be input to the first shaft 100 is 1, the rotational speeds to be given to the first, second and third elements via the first, second and third counter gear sets 1, 2, 3 and by way of the clutches C1, C2, C3 are α1=0.628, α2=0.687 and α3=1.

Varying speeds are determined each by restraining two f the first, second and third elements by engaging the clutches C1, C2, C3 and applying brakes B1, B2 with the hydraulic pressure of unillustrated control values or by operating one-way clutch OWC.

The rotational speeds of the elements for each speed can be obtained by connecting two of C1, C2, C3, B1 (OWC), B2 shown in FIG. 7 with a straight line. The value obtained by dividing the input of rotational speed 1 to the first shaft 100 by the rotational speed, which is the output, of the fourth element is a gear ratio.

The first element belongs to the first planetary gear set 20, the second element to the first and second planetary gear sets 20, 30, the third element to the second planetary gear set 30, and the fourth element to the first and second planetary gear sets 20, 30.

Accordingly, the power of only the first speed and fourth speed to be obtained, with the rotational speed of the first and third elements restrained, is passed through both the first and second planetary gear sets 20, 30, while the power passes through only one of these gear sets 20, 30 for the other speeds.

FIG. 8 shows the gear ratios of the respective speeds obtained from FIG. 7.

The overall gear ratio range obtained by dividing the gear ratio of the first speed by the gear ratio of the sixth speed is as great as 6.387.

The ratio between the gear steps decreases like 1.345, 1.334, 1.268 with a speed increase from the third to higher speeds, and the desirable gear ratio can be obtained.

The overall gear ratio range is much greater than the overall gear ratio range, which is 4, of four-forward-speed, one-reverse-speed automatic speed change apparatus presently in use. As regards the ratios between the gear steps, the corresponding steps between the third speed and the fourth speed of the four-forward-speed, one-reverse-speed automatic speed change apparatus presently in use is about 1.4 to 1.5, and like steps of the invention are smaller than this value, hence an advantageous result for fuel consumption.

Figures 9, 10:
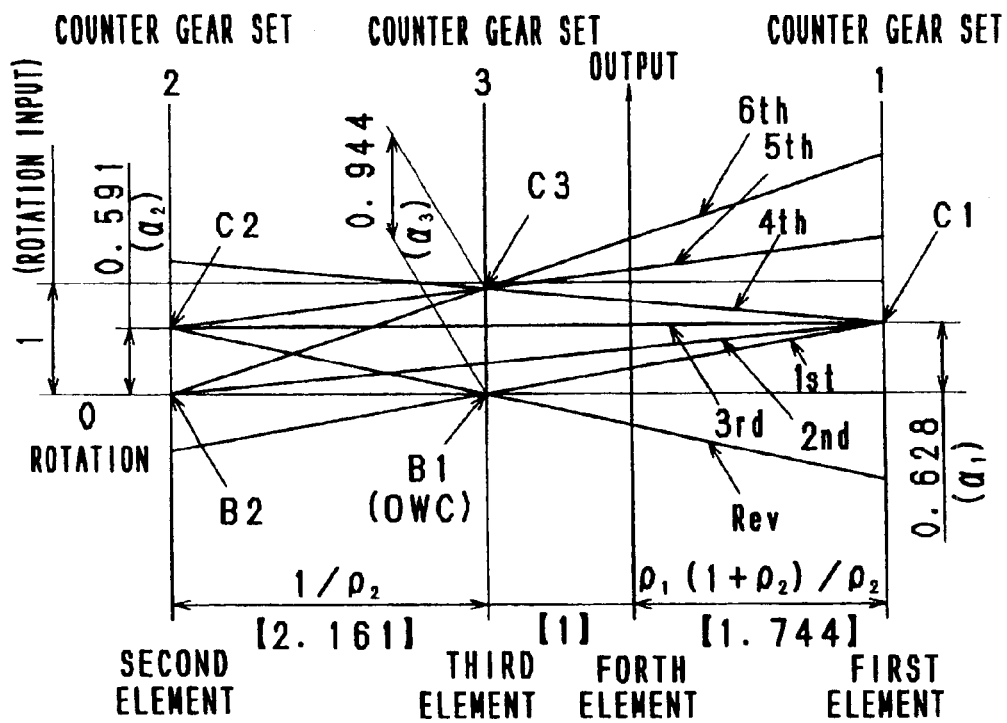
FIG. 9 includes tables showing the specifications of gears of a second embodiment.
FIG. 10 is a speed diagram showing varying speeds of the second embodiment.

FIGS. 9, 10 and 11 show a second embodiment of the invention.

With reference to FIG. 9, the reciprocals α1, α2, α3 of reduction gear ratios of the first, second and third counter gear sets 1, 2, 3 providing the first, second and third drive paths are:

α1=0.628
α2=0.591
α3=0.944

Thus, the counter gear set 3 is the smallest in reduction gear ratio. Conversely to the first embodiment, the counter gear set 1 is set at a slightly smaller value than the counter gear set 2 in this ratio, and the second counter gear set 2 and the third counter gear set 3 are altered in the number of teeth.

The gears constituting the planetary gear sets are made identical with those of the first embodiment in the number of teeth.

FIG. 10 is a speed diagram of the second embodiment prepared according to the meshing law of planetary gears.

The first to fourth elements of the first and second planetary gear sets 20, 30 are the same as those of the first embodiment.

Assuming that the rotational speed to be input to the first shaft 100 is 1, the rotational speeds to be input to the first, second and third elements via the first, second and third counter gear sets 1, 2, 3 and by way of the clutches C1, C2, C3 are α1=0.628, α2=0.591 and α3=0.944.

This embodiment operates exactly in the same manner as the first. FIG. 10 for the second embodiment is comparable to FIG. 7 for the first embodiment, and FIG. 11 for the second embodiment to FIG. 8 for the first embodiment.

The overall gear ratio range obtained by dividing the gear ratio of the first speed by the gear ratio of the sixth speed is 6.035 which is smaller than in the first embodiment. Further as to the step between the gear ratios, the corresponding step between the second speed and the third speed, and like step between the fifth speed and the sixth speed are smaller than in the first embodiment.

According to the present invention, the clutch C1 is engaged for the forward first, second, third and fourth speeds which are frequently used, and the power is passed through the first counter gear set 1 and input to the ring gear 23 of the first planetary gear set 20, so that the load acting on the gear tooth faces is smaller to ensure efficient drive.

The preferred gear ratio differs from vehicle to vehicle, and the almost desirable gear ratio is readily available by varying the numbers of teeth of counter gears without changing planetary gear portions as shown with reference to the first and second embodiments.

To achieve a cost reduction, the first and second planetary gear sets 20 and 30 may be made identical in the numbers and teeth of constituent gears and the shape thereof.

Advantages of the Invention

With the automatic speed change apparatus of the invention, an input shaft 100, intermediate shaft 200 and output shaft 300 are arranged in parallel, the input shaft 100 is coupled to the intermediate shaft 200 by counter gear sets 1, 2, 3 providing first, second and third drive paths, planetary gear sets 20, 30 are arranged in respective spaces between the counter gear sets 1, 2, 3 on the intermediate shaft 200, the input shaft 100 is provided with clutches C2, C3 for engaging or disengaging the second and third drive paths and with a brake B2 for braking the second drive path, the intermediate shaft 200 is provided with a clutch C1 for engaging or disengaging the first drive path, and a brake B1 and one-way clutch 232 for braking the third drive path, the first drive path is coupled to a ring gear 23, the second drive path is coupled to sun gears 21, 31, the third drive path is coupled to a planetary carrier 34, a planetary carrier 24 and ring gear 33 are connected to the intermediate shaft, and a fourth counter gear set delivers power to the output shaft having a parking gear 341. This arrangement therefore realizes a simple and compact six-forward-speed, one-reverse-speed automatic speed change apparatus.

More specifically, the apparatus of the invention has the following advantages.

(1) The input shaft 100, the intermediate shaft 200 and the output shaft 300 dividedly serve as the functional components of the speed change apparatus. Accordingly, the input shaft 100 which is provided with the clutches C2, C3 and brake B2 is shorter than in four-forward-speed, one-reverse-speed automatic speed change devices presently available, and the intermediate shaft 200 having the friction members of the clutch C1 and the brake B1 as arranged at an outer peripheral portions of the planetary gear sets is further shorter than the input shaft 100. Additionally, oil inlets to the input shaft 100 and the intermediate shaft 200 are provided in side faces of front portions of the apparatus, so that the apparatus is further shortened in its entirety and is given an increased loading capacity.

(2) The counter gears are supported by a needle bearing on the input shaft 100 or intermediate shaft 200 at the inner peripheral portion the gear, and the input shaft 100 and the intermediate shaft 200 as arranged at a reduced bearing-to-bearing spacing are supported by housings. This renders the counter gears meshable with improved accuracy and with reduced noise.

(3) Since different rotations can be input to the planetary gear sets by virtue of the three kinds of counter gear sets, reduction gear ratios can be determined with increased freedom. Altered gear ratios can be given only by changing counter gears for use with a wide variety of vehicles.

(4) Use of planetary gear sets wherein power is input to the ring gear to obtain first to fourth forward speeds which are frequently used serves to lessen the load on the gear tooth faces to achieve an improved efficiency.

What is claimed is:

1. A six-forward speed, one-reverse-speed automatic speed change apparatus for motor vehicles comprising:
    a first shaft (100) for receiving power from a prime mover via a torque converter (10);
    a second shaft (200) disposed in parallel with the first shaft (100) for transmitting the power therethrough;
    a third shaft (300) provided in parallel to the second shaft (200) for delivering the power through a differential gear (40);
    first and second planetary gear sets (20)(30) provided on the second shaft (200) and comprising first, second and third elements for receiving power and a fourth element for delivering power therethrough;
    first, second and third drive paths for connecting the first shaft (100) to the first, second and third elements of the first and second planetary gear sets (20)(30);
    first, second and third counter gear sets (1)(2)(3) providing the first, second and third drive paths, respectively, and each comprising two gears in mesh with each other;
    clutches (C1)(C2)(C3) provided in the first, second and third drive paths, respectively;
    brakes (B2)(B1) provided in the respective second and third drive paths for braking the respective second and third elements;
    a one-way clutch (232) provided in the third drive path for braking the third element only in a direction opposite to the direction of rotation thereof in which power is input; and
    a fourth counter gear set coupling the second shaft (200) to the third shaft (300),
    wherein a ring gear (23) of the first planetary gear set (20) serves as the first element having the first drive path connected thereto,
    wherein a planetary carrier (24) supporting planetary gears (22) in mesh with the ring gear (23) serves as the fourth element,
    wherein a sun gear (21) meshing with the planetary gears (22) is joined to a sun gear (31) of the second planetary gear set (30) to provide the second element having the second drive path connected thereto,
    wherein a planetary carrier (34) supporting planetary gears (32) in mesh with the sun gear (31) serves as the third element having the third drive path connected thereto,
    wherein a ring gear (33) meshing with the planetary gears (32) serves as the fourth element,
    wherein the planetary carrier (24) and the ring gear (23) serving as the fourth elements are joined to the second shaft (200) for transmitting power therethrough, and
    wherein two of the clutches (C1)(C2)(C3) for controlling the first, second and third drive paths, the brakes (B2)(B1) and the one-way clutch (232) are selectively engaged to obtain seven speeds.

2. The six-forward-speed, one-reverse-speed automatic speed change apparatus according to claim 1,
    wherein the first, second and third drive paths for coupling the first shaft (100) to the second shaft (200) are arranged in this order in the direction of the torque converter (10),
    wherein the first planetary gear set (20) is disposed on the second shaft (200) between the first and second drive paths,
    wherein the second planetary gear set (30) is disposed on the second shaft (200) between the second and third drive paths,
    wherein the clutch (C1) provided in the first drive path and the brake (B1) and the one-way clutch (232) provided in the third drive path are arranged on the second shaft (200),
    wherein the clutch (C2) and the brake (B2) provided in the second drive path and the clutch (C3) provided in the third drive path are arranged on the first shaft (100), and
    wherein the fourth counter gear set coupling the second shaft (200) to the third shaft (300) is disposed closer to the torque converter (10) than the first chive path.

3. The six-forward-speed, one-reverse-speed automatic speed change apparatus according to claim 1,
    wherein the ring gear (23) serving as the first element of the first planetary gear set (20) is held between the planetary carrier (24) and the counter gear (210) provided on the second shaft (200) and included in the first counter gear set (1) by a plate connected to the ring gear (23) by means of a thrust bearing,
    wherein the sun gear (21) and the sun gear (31) joined together and providing the second element are integral with the counter gear (220) provided on the second shaft (200) and included in the second counter gear set (2),
    wherein the planetary carrier (34) serving as the third element is supported by a bush on the second shaft (200) and connected to the counter gear (230) provided on the second shaft (200) and included in the third counter gear set (3) by a joint at an outer peripheral portion of the second planetary gear set (30),
    wherein the planetary carrier (24) and the ring gear (23) serving as the fourth elements are splined to the second shaft (200) for transmitting power therethrough respectively at different positions, and
    wherein a spline hub of the ring gear (33) has splined bore opposite end portions fitting around the second shaft (200) so as to be coaxial therewith.

4. The six-forward-speed, one-reverse-speed automatic speed change apparatus according to claim 1,
    wherein the counter gear (110) of the first counter gear set (1) providing the first drive path is integral with the first shaft (100), and the counter gear (210) meshing with the counter gear (110) is rotatably held by a needle roller bearing (211) on the second shaft (200),
    wherein the counter gear (120) of the second counter gear set (2) providing the second drive path is rotatably held by a needle roller bearing (121) on the first shaft (100), and the counter gear (220) meshing with the counter gear (120) is rotatably held by a needle roller bearing (221) on the second shaft (200), wherein the counter gear (130) of the third counter gear set (3) providing the third drive path is rotatably held by a needle roller bearing (131) on the first shaft (100), and the counter gear (230) meshing with the counter gear (130) is rotatably held by a needle roller bearing (231) on the spline hub integral with the ring gear of the second planetary gear set, wherein the counter gear (110) integral with the first shaft (100) has an inner periphery thereof supported by a cylindrical roller bearing (140) on a support fixed to a housing (5) of the speed change apparatus to thereby support the first shaft (100), and the first shaft (100) is supported by a wall portion (5a) and a boss portion (5b) which are integral with the housing (5) of the speed change apparatus by means of needle roller bearings (150) and (160), and wherein the second shaft (200) has opposite ends thereof supported respectively by tapered roller bearings (250) and (260) on a torque converter housing (4) and a rear cover (6) which are fixed to the housing (5) of the apparatus.

5. A six-forward-speed, one-reverse-speed automatic speed change apparatus according to claim 1, wherein the clutches (C1)(C2)(C3) for controlling the respective first, second and third drive paths and the brakes (B2) (B1) are hydraulic actuators having first, second, third, fourth and fifth friction members, piston and piston return springs respectively, and the one-way clutch for controlling the third drive path is a mechanical actuator, wherein the clutch (C1) provided on the second shaft (200) has the first friction members arranged at an outer peripheral portion of the first planetary gear set (20), a connecting-holding member welded to the counter gear (210) and holding one of the first friction members against rotation but axially movably, the first piston and the first return spring which are held by the counter gear (210), and an outer peripheral connecting portion of the ring gear (23) for holding the other first friction member against rotation but axially movably, wherein the brake (B1) provided on the second shaft (200) has the fifth friction members arranged at an outer peripheral portion of the second planetary gear set (30), a connecting-holding member integral with the wall portion 5a of the housing 5 for holding one of the fifth friction members against rotation but axially movably, the fifth piston held by the rear cover 6 supporting the tapered roller bearing (260) and having a cutout at a portion thereof to be interfered with by the counter gear (130), the fifth return spring, and a connecting-holding member extending from the planetary carrier (34) for holding the other fifth friction member against rotation but axially movably, wherein the one-way clutch (232) provided on the second shaft (200) having an inner race connected to the rear cover 6 holding the piston of the brake (B1) and an outer race provided by the inside of an outer peripheral portion of the counter gear (230), wherein the clutch (C2) provided on the first shaft (100) has the second friction members arranged at the same position as the first friction members of the clutch (C1) with respect to the axial direction, a connecting-holding member welded to the counter gear (110) and holding one of the second friction members against rotation but axially movably, the second piston and the second return spring which are held by the first shaft (100) and the counter gear (110), and a connecting-holding member welded to the counter gear (120) and holding the other second friction member against rotation but axially movably, wherein the brake (B2) provided on the first shaft (100) has the fourth friction members arranged at the same position as the fifth friction members of the brake (B1) with respect to the axial direction, a connecting-holding member of the housing (5) for holding one of the fourth friction members against rotation but axially movably, the fourth piston and the fourth return spring which are held by the boss portion (5b) and the wall portion (5a), and a connecting-holding member welded to the counter gear (120) and holding the other fourth friction member against rotation but axially movably, and wherein the clutch (C3) provided at an end portion of the first shaft (100) has a clutch case splined to the first shaft (100), one of the third friction members held by the clutch case against rotation but axially movably, the third piston and the third return spring which are held by the clutch case, and a connecting-holding member welded to the counter gear (130) and holding the other third friction member against rotation but axially movably.

6. A six-forward-speed, one-reverse-speed automatic speed change apparatus according to claim 1, wherein the reduction gear ratios of the respective counter gear sets (1)(2)(3) providing the first, second and third drive paths obtained by dividing the numbers of teeth of the counter gears (210)(220)(230) on the second shaft (200) by the respective numbers of teeth of the counter gears (110)(120)(130) on the first shaft (100) and meshing therewith are so determined that the counter gear set (1) and the counter gear set (2) are the same or different in reduction gear ratio, and the counter gear set (3) is smaller than the counter gear sets (1)(2) in reduction gear ratio.

7. A six-forward-speed, one-reverse-speed automatic speed change apparatus according to claim 1, wherein inlets to the first shaft (100) of first and second oil channels (401)(402) for guiding a hydraulic oil to the clutches (C2)(C3) on the first shaft (100) are formed by circumferential grooves in an outer periphery of the first shaft (100) and three rotating seal rings around the outer periphery and in contact with an inner peripheral portion of the support fixed to the housing (5), wherein an inlet to the first shaft (100) of an third oil channel (403) for guiding a supply oil of low pressure to bearings, etc. arranged for the first shaft (100) is formed in side portions of the support (7) and the gear (110) by one rotating seal ring in contact with an inner peripheral portion of the counter gear (110) and disposed around the support (7) for the cylindrical roller bearing (140), a circumferential groove formed in the outer periphery of the first shaft (100) and a rotating seal ring adjacent to said one rotating seal ring, and wherein an inlet to the second shaft (200) of an fourth oil channel (404) for guiding a hydraulic oil to the clutch (C1) on the first shaft (100) and an inlet to the second shaft (200) of an fifth oil channel (405) for guiding a supply oil of low pressure to bearings, etc. arranged for the second shaft (200) are formed in a stepped bore formed in the second shaft (200) at one end thereof where the tapered roller bearing (250) is positioned, the inlets being defined by two rotating seal rings which are provided around an outer periphery of stepped portion of a channel-attached member fastened to the torque converter housing (4) and which are in contact with respective two portions, having different diameters, of an inner periphery of the shaft end defining the stepped bore, the inlets being formed in an upper part of the stepped bore and in the center of the stepped bore.

8. Automatic speed change apparatus for motor vehicles as recited in claim 1, wherein said fourth counter gear set has a counter gear (340) on the third shaft (300) and is provided with a parking gear (341).

* * * * *